Oct. 2, 1928.

J. F. MacINDOE 1,686,241

GREASE CUP

Filed March 3, 1927

2 Sheets-Sheet 1

Inventor
JOHN F. MACINDOE,
BY
Robert M. Barr,
Attorney

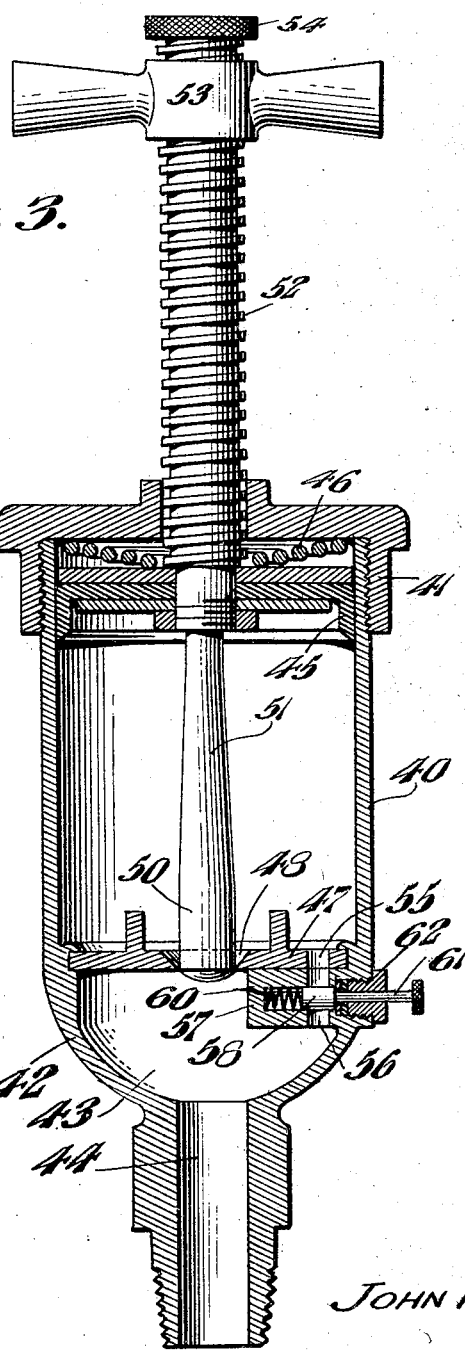

Patented Oct. 2, 1928.

1,686,241

UNITED STATES PATENT OFFICE.

JOHN FRANKLIN MacINDOE, OF PHILADELPHIA, PENNSYLVANIA.

GREASE CUP.

Application filed March 3, 1927. Serial No. 172,387.

The present invention relates to grease cups and more particularly to an automatically controlled and proportioned grease feeding mechanism.

Some of the objects of the present invention are to provide an improved grease cup feeding mechanism applicable to cups of either the hand filled or pressure filled type; to provide means for regulating the quantity of grease fed from a cup in proportion to the applied pressure; to provide a control plate for grease cups whereby regulated flow of grease is maintained under all operating conditions; to provide a control plate in combination with a proportioning valve for producing an efficient grease cup feed; to provide means for proportioning grease flow in accordance with different operating conditions; to provide means for adapting a grease cup to any one of a number of different feeding conditions; to provide a grease cup with an emergency supply of grease which automatically becomes available under abnormal conditions; and to provide other improvements as will hereinafter appear.

Figure 1:
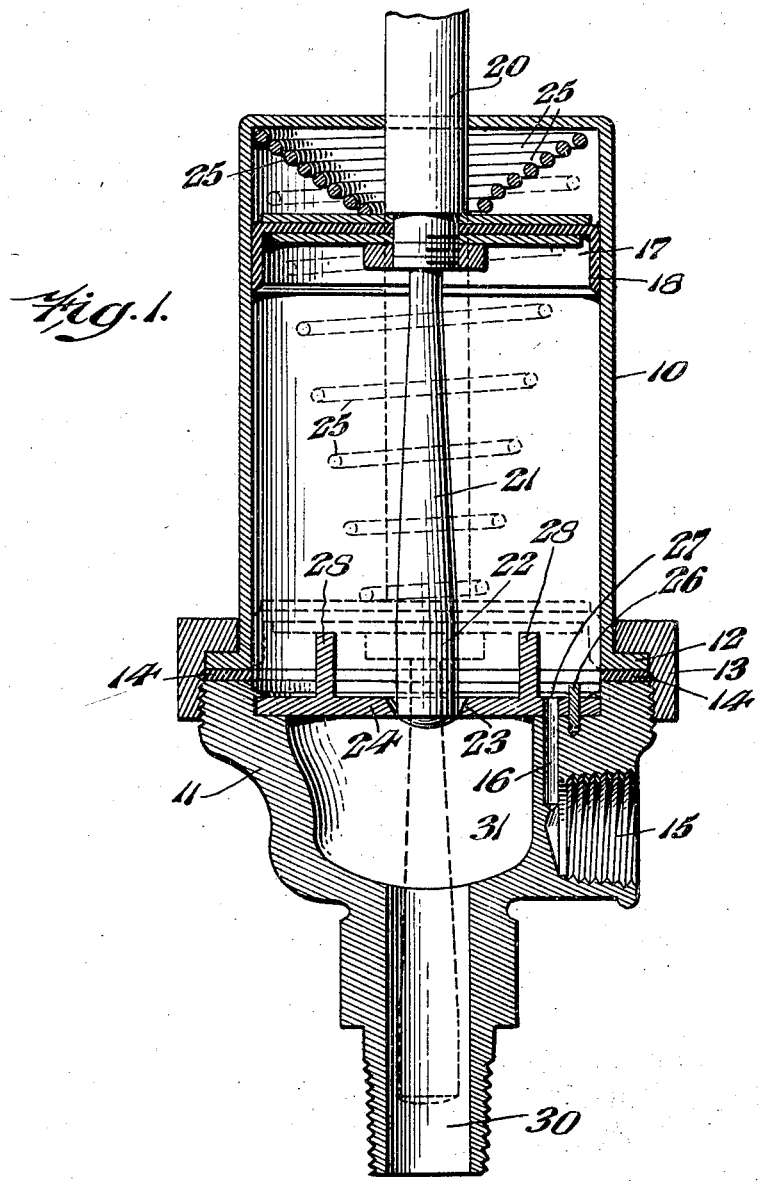
Figure 2:
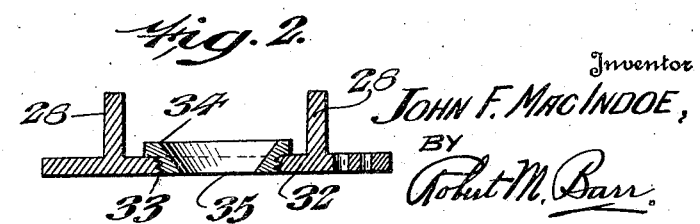

In the accompanying drawings, Fig. 1 represents a sectional elevation of a pressure filled grease cup embodying one form of the present invention; Fig. 2 represents a sectional detail of a modified form of control plate; and Fig. 3 represents a sectional elevation of a modified form of the invention arranged for hand filling and operation.

Referring to the drawings, one form of the present invention is shown in Fig. 1 as a pressure filled type of grease cup comprising a cup body 10 and a discharge member 11, the former having a circumferential flange 12 about its open end seating upon the member 11 and made fast thereto by a cap 13 which has threaded engagement with the member 11. A gasket 14 is interposed between the flange 12 and the member 11, to prevent leakage at the joint there formed.

For filling the cup 10 by pressure means, such as a grease gun and proper attaching fittings, the member 11 is provided by a laterally disposed inlet 15 which is suitably threaded to receive the attaching parts and communicates with a port 16 leading to the interior of the cup 10. The grease upon entering the cup 10 is forced against a piston 17 formed as a cup leather 18 fixed to a shank or stem 20 which extends in one direction through the closed end of the cup 10 and in the other direction as a control plunger 21. This plunger 21 is gradually tapered outwardly from the piston 17 and merges into a cylindrical valve member 22, which in filled condition of the cup fits a discharge outlet port 23 in a control plate 24, so as to give a predetermined minimum flow of grease under the action of an ejecting coil spring 25. The spring 25 is compressed between the piston 17 and the end of the cup 10 and serves to gradually expel the grease by way of the port 23. The plate 24 seats in a recessed part of the annular face of the member 11 where it is held by crimping the metal of the body 11 and is provided with a hole 27 for alignment with the port 16, being held in such alignment by a dowel pin 26. Upstanding lugs 28 are formed on the plate 24 to stop the movement of the piston 17 at the end of its working stroke.

In order to restrict the quantity of grease to a predetermined minimum flow when the valve member 22 is in the position corresponding to the filled condition of the cup, the plate 24 is provided with the port 23 which is bevelled to provide an easy guide entrance for the control valve 21 and reduces the control edge to a minimum thickness. This port 23 is located in axial alignment with a discharge conduit 30 of the member 11. This conduit 30 receives the plunger 21 when the latter moves under the action of the spring pressed piston 17 and so maintains regulation of the grease as it passes to the bearing or other part to be lubricated.

For the purpose of providing a reserve or emergency supply of grease, the member 11 is formed with an enlarged chamber 31, into which the port 23 delivers the discharged grease, and the other end of this chamber merges into the conduit 30 with a gradual smooth curve tending to promote an easy flow to the grease. Under normal operating conditions, the chamber 31 remains filled with grease, its outlet end feeding the conduit 30 while its receiving end is replenished in regulated quantities proportioned to the variation in the tension of the spring 25. In case the bearing which the cup is to feed should heat by failure to receive proper lubrication, this heat will be transmitted to the member 11 and cause the grease in the chamber 31 to run through the conduit 30 to flood the bearing and thus prevent damage.

From the foregoing, it will be apparent that not only is the grease discharge through the port 23 proportioned with respect to the diminishing pressure of the spring 25, but under filling conditions the reverse action takes place. Thus, as grease is forced into the cup 10 by way of the inlet 15 and port 16, the plunger 17 is forced upward and the area of the port 23 in the plate 24 is reduced in proportion as the pressure of the spring 25 increases under compression. This makes it possible to fill the cup in the open air, since it is unnecessary to provide a closure for the conduit 30.

In the modification of Fig. 2, a control plate is shown having a threaded central opening 33 to receive a bushing 34 having a tapered port 35 therethrough for the purpose of receiving and allowing the passage of the valve 22.

In the modification of Fig. 3, a development of the cup from the earlier form shown in applicant's Patent No. 1,159,517 and Patent No. 1,283,841, a cup 40 of the hand filled type is shown having an open top threaded to receive a cap closure 41 and preferably provided with an integral discharge member 42 forming a supplemental chamber 43 which communicates with a discharge outlet 44. In this form, the plunger or piston 45 is moved to eject the grease from the cup by the action of a coil spring 46 located and compressed between the piston 45 and the closure 41. A proportionate discharge of the grease from the cup under the action of the piston 45 is provided in the form of a plate 47 having a tapered axially located port 48 to receive the control member which comprises a cylindrical valve end 50 and tapered stem 51 which is fastened to the piston 45 and forms part of a threaded stem 52 which projects through the cap 41 and has free sliding movement therethrough. The stem 52 is threaded to receive a thumb nut 53, while a cap nut 54 prevents the handle from running off of the end of the shank. The thumb nut 53 is shown in proper position for cup discharge by the action of the coil spring 46, and it serves as a means for drawing the plunger back to filling position in the cap 41.

For controlling the quantity of grease discharging from the cup 40 to the chamber 43 under abnormal conditions, the control plate 47 is provided with a port 55 aligned with a discharge passage 56 formed in a valve body 57 of the member 42. This valve body 57 is bored transversely of the passage 56 to receive a valve 58 which is normally held closing the passage 56 by a spring 60 and also has a stem 61 projecting through a stuffing box 62 to the exterior of the cup for manual control. Normally, the valve 58 is closed and the grease discharges in regulated quantities through the port 48, but should an increase in the feed be desired the valve 58 can be moved to open position, thereby establishing communication by way of the passage 56 from the cup 40 to the chamber 43.

Having thus described my invention, I claim:

1. The combination of a grease cup having a discharge outlet, a control plate having a port therethrough, said plate dividing said cup into a main grease reservoir and an auxiliary grease reservoir, a spring pressed piston for forcing grease through said port, and means located in said port and controlled by said piston for automatically varying the quantity of grease passing through said port.

2. The combination of a grease cup having a discharge outlet, a control plate having a port therethrough, said plate dividing said cup into a main grease reservoir and an auxiliary grease reservoir, a spring pressed piston for forcing grease through said port, and means including a tapered valve part attached to said piston and located in said port for automatically varying the quantity of grease passing through said port.

3. The combination of a grease cup having a discharge outlet, a control plate having a port therethrough, said plate dividing said cup into a main grease reservoir and an auxiliary grease reservoir, a spring pressed piston for forcing grease through said port, and a plunger attached to said piston and located in said port in all positions of said piston, said plunger having a cylindrical control end and a part uniformly diminishing in diameter toward said piston.

4. The combination of a grease cup having a discharge outlet and forming a reservoir for grease, a spring pressed piston for discharging grease from said reservoir to said outlet, and means forming an auxiliary reservoir having a substantially unrestricted outlet for grease and arranged to be subjected to the heat of a bearing under abnormal conditions whereby the grease in said auxiliary reservoir automatically feeds to said bearing.

5. The combination of a grease cup having a discharge outlet and forming a reservoir for grease, a spring pressed piston for discharging grease from said reservoir to said outlet, means to proportion the flow of grease from said reservoir in accordance with the spring pressure on said piston, and means forming an auxiliary reservoir having a substantially unrestricted outlet for grease and arranged to be subjected to the heat of a bearing under abnormal conditions whereby the grease in said auxiliary reservoir automatically feeds to said bearing.

6. The combination of a grease cup having a discharge outlet, a valve plunger axially aligned with said outlet, a spring pressed piston connected to said plunger and operative to move said plunger towards said outlet, and a control plate spaced from said outlet and having a bevelled port aligned with said outlet to receive said plunger.

7. The combination of a grease cup having a discharge outlet, a valve plunger axially aligned with said outlet, said plunger having a cylindrical end and a shank tapered away from said discharge outlet, a spring pressed piston connected to said plunger and operative to move said plunger towards said outlet, and a control plate spaced from said outlet and having a bevelled port aligned with said outlet.

Signed at Philadelphia, county of Philadelphia, State of Pennsylvania, this 1st day of March, 1927.

JOHN FRANKLIN MacINDOE.